United States Patent [19]

Ito et al.

[11] Patent Number: 4,768,566
[45] Date of Patent: Sep. 6, 1988

[54] FUEL TANK HAVING AN INLET PIPE WITH A GUIDE AND VENTURI RESTRICTION

[75] Inventors: Takaaki Ito, Mishima; Koji Uranishi, Susono, both of Japan

[73] Assignee: Toyota Jidosha Kabushiki Kaisha, Aichi, Japan

[21] Appl. No.: 16,102

[22] Filed: Feb. 18, 1987

[30] Foreign Application Priority Data

Feb. 21, 1986 [JP] Japan ................................ 61-035273

[51] Int. Cl.⁴ ........................ B65D 25/00; B65D 3/04
[52] U.S. Cl. ..................................... 141/46; 141/285; 220/85 R; 220/85 VR; 220/85 VS; 137/588
[58] Field of Search ............... 220/85 R, 85 S, 85 VS, 220/85 VR, 86 R; 137/587, 588; 141/44, 45, 67, 285, 286, 392, 391

[56] References Cited

U.S. PATENT DOCUMENTS

| | | | |
|---|---|---|---|
| 2,620,822 | 12/1952 | Peterson et al. | 137/588 |
| 3,633,609 | 1/1972 | Benner et al. | 137/351 |
| 3,854,911 | 12/1974 | Walker | 220/85 VS |
| 3,863,687 | 2/1975 | Alquist | 141/45 |
| 3,872,900 | 3/1975 | Gotz | 141/392 |
| 3,907,153 | 9/1975 | Mutty | 220/86 R |
| 3,910,302 | 10/1975 | Sodhir | 137/43 |
| 3,911,977 | 10/1975 | Berger | 141/348 |
| 3,912,117 | 10/1975 | Ryding | 220/86 R X |
| 3,913,633 | 10/1975 | Hiller | 141/45 |
| 3,937,357 | 2/1976 | Burgess | 220/203 |
| 4,000,727 | 1/1977 | Walker | 220/85 VR X |
| 4,024,848 | 5/1977 | Lee | 220/85 VR X |
| 4,057,086 | 11/1977 | Healy | 141/44 X |
| 4,142,647 | 3/1979 | Walters | 220/85 S |
| 4,232,715 | 11/1980 | Pyle | 141/1 |
| 4,310,033 | 1/1982 | Peters | 141/44 |
| 4,312,649 | 1/1982 | Fujii et al. | 55/387 X |
| 4,327,783 | 5/1982 | Kanno et al. | 220/86 R X |
| 4,394,925 | 7/1983 | Rump et al. | 220/86 R |
| 4,450,880 | 5/1984 | Scheurenbrand | 141/285 |
| 4,572,394 | 2/1986 | Tanahashi et al. | 220/86 R |
| 4,630,749 | 12/1986 | Armstrong et al. | 220/86 R |
| 4,651,889 | 3/1987 | Uranishi et al. | 220/85 VR |
| 4,671,071 | 6/1987 | Sasaki | 141/45 X |
| 4,700,864 | 10/1987 | Galles et al. | 220/86 R |
| 4,714,172 | 12/1987 | Morris | 220/86 R |
| 4,722,454 | 2/1988 | Fischer | 220/85 R |

FOREIGN PATENT DOCUMENTS

| | | |
|---|---|---|
| 155186 | 9/1985 | European Pat. Off. ............. 141/44 |
| 931030 | 7/1955 | Fed. Rep. of Germany . |
| 2353448 | 4/1975 | Fed. Rep. of Germany .... 220/86 R |
| 59-53122 | 7/1984 | Japan . |
| 60-47627 | 3/1985 | Japan . |
| 60-23501 | 12/1985 | Japan . |
| 1259732 | 1/1972 | United Kingdom . |

*Primary Examiner*—Henry J. Recla
*Assistant Examiner*—Ernest G. Cusick
*Attorney, Agent, or Firm*—Finnegan, Henderson, Farabow, Garrett and Dunner

[57] ABSTRACT

A fuel tank comprising a fuel inlet pipe. A fuel pump nozzle is inserted into the fuel inlet pipe. A throat portion having a venturi shaped cross-section is arranged in the fuel inlet pipe between the interior space of the fuel tank and the tip of the fuel pump nozzle inserted into the fuel inlet port. Fuel spouted from the fuel pump nozzle passes through the entire cross-section of the throat portion.

6 Claims, 2 Drawing Sheets

FUEL TANK HAVING AN INLET PIPE WITH A GUIDE AND VENTURI RESTRICTION

BACKGROUND OF THE INVENTION

1. Field of the Invention

The present invention relates to a fuel tank.

2. Description of the Related Art

In a known fuel tank, the upper space in the interior of the fuel tank is connected to the fuel inlet pipe of the fuel tank via a breather pipe (for example, Japanese Unexamined Utility Model Publication No. 60-47627). In this fuel tank, when fuel is fed into the fuel tank from the fuel inlet pipe, and the level of the liquid surface of fuel in the fuel tank moves upward, the fuel vapor in the upper space of the fuel tank is discharged into the fuel inlet pipe via the breather pipe.

In this fuel tank, however, when fuel is fed into the fuel tank from the fuel pump nozzle, the fuel spouted from the nozzle comes into violent contact with and agitates the fuel in the fuel tank, causing bubbles to form in the fuel in the fuel tank. The collapsing of these bubbles causes a large amount of fuel vapor to be generated in the fuel tank, and this fuel vapor directly escapes from the fuel tank into the outside air via the fuel inlet pipe or escapes from the fuel tank into the outside air via the breather pipe and the fuel inlet pipe, causing air pollution.

In addition, the fuel inlet pipe is normally equipped with a sensor arranged on the outer circumferential face of the tip of the fuel pump nozzle to automatically stop the fuel feeding operation when the sensor comes into contact with the liquid fuel. Due to the presence of this sensor, when the level of the liquid surface of fuel in the fuel inlet pipe moves upward and reaches the level of the sensor, the fuel feeding operation is automatically stopped. However, this sensor reacts not only to the liquid fuel, but also to the fuel bubbles. Consequently, if a large amount of bubbles is generated as above-mentioned, a problem occurs in that, when the bubbles move upward in the fuel inlet pipe and come into contact with the sensor, the fuel feeding operation will be stopped although the level of the liquid surface of fuel in the fuel tank is low.

SUMMARY OF THE INVENTION

An object of the present invention is to provide a fuel tank capable of preventing air pollution caused by the fuel vapor and of preventing a stoppage of the fuel feeding operation by fuel bubbles generated in the fuel tank.

According to the present invention, there is provided a fuel tank having an interior space therein, comprising: a fuel inlet pipe connected to the interior space and having a fuel inlet into which a fuel pump nozzle having a tip is inserted; a restricted opening arranged in the fuel inlet pipe between the interior space and the tip of the fuel inlet pipe inserted into the fuel inlet, the restricted opening being formed by throat portion having an inner diameter smaller than that of the fuel inlet pipe; and a fuel vapor purifying means connected to the interior space to allow pressure in said interior space to escape and to purify fuel vapor generated in the interior space.

The present invention may be more fully understood from the description of preferred embodiments of the invention set forth below, together with the accompanying drawings.

DESCRIPTION OF THE PREFERRED EMBODIMENTS

Figure 1:
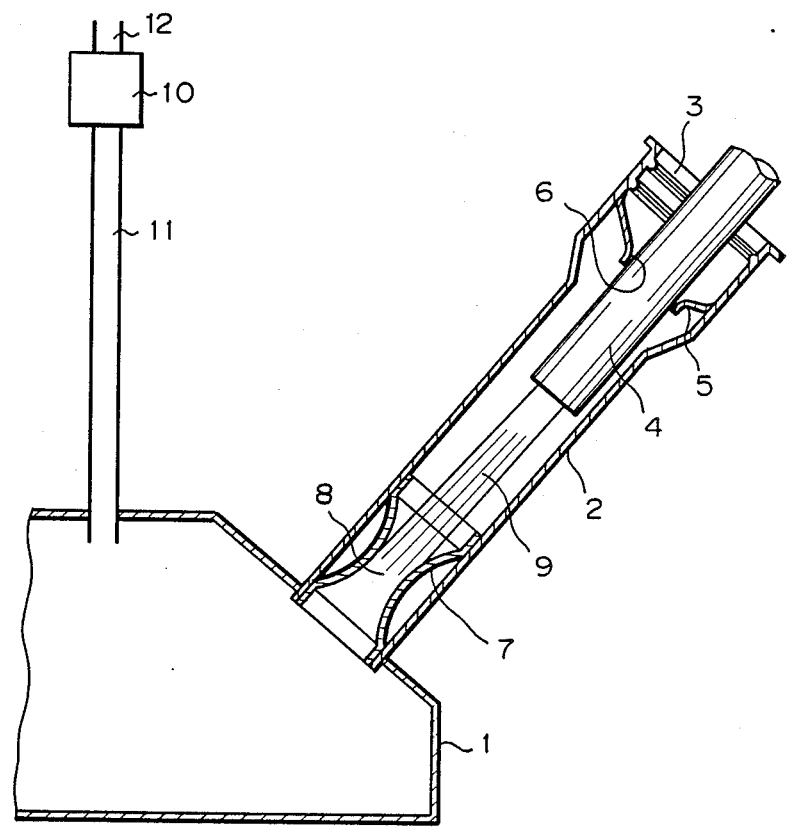
FIG. 1 is a cross-sectional side view of a first embodiment of a fuel tank according to the present invention.

FIG. 1 illustrates a first embodiment of the present invention. Referring to FIG. 1, 1 designates a fuel tank, 2 a cylindrically shaped fuel inlet pipe, 3 a fuel inlet of the fuel inlet pipe 2, and 4 a fuel pump nozzle inserted into the fuel inlet pipe 2 from the fuel inlet 3. The fuel inlet 3 is normally closed by a cap (not shown). When the fuel filling operation is carried out, the cap is initially detached and the fuel pump nozzle 4 then inserted in the fuel inlet pipe 3 as illustrated in FIG. 1. A guide means 5 is arranged in the fuel inlet 3 to guide the fuel pump nozzle 4 thereinto. In the embodiment illustrated in FIG. 1, this guide means 5 is formed by a thin plate having a funnel shape, and a guide bore 6 having an inner diameter which is slightly larger than the outer diameter of the fuel pump nozzle 4 formed in the central portion of this guide means 5. A restricted opening means 7 having a venturi shaped cross-section is arranged in the fuel inlet pipe 2 at a position near the fuel tank 1 relative to the tip of the fuel pump nozzle 4 inserted in the fuel inlet pipe 2. This restricted opening means 7 is formed by a thin plate which is fixed to the inner wall of the fuel inlet pipe 2. The throat portion 8 of the venturi cross-sectional restricted opening means 7 has an inner diameter such that the fuel 9 spouted from the fuel pump nozzle 4 passes through the entire cross-section of the throat portion 8. The upper space in the fuel tank 1 is connected, via a conduit 11, to a canister 10 containing charcoal therein, and the canister 10 is connected to the intake passage of the engine (not shown) via a conduit 12. The interior of the fuel tank 1 is open to the outside air via the conduit 11 and the canister 10, and fuel vapor generated in the fuel tank 1 is absorbed by the charcoal in the canister 10. Consequently, the conduit 11 and the canister 10 form a fuel vapor purifying means for allowing the pressure in the fuel tank 1 to escape, and for purifying the fuel vapor generated in the fuel tank 1. The fuel inlet 3 is normally closed by the cap (not shown). At this time, pressure in the fuel tank 1 is maintained at the atmospheric pressure as long as the level of the liquid surface of fuel in the fuel tank 1 is not located above the lower open end of the conduit 11. When the fuel filling operation is carried out, the level of the liquid surface of fuel in the fuel tank 1 is normally located at a considerably lower position relative to the lower open end of the conduit 11 and thus, at this time, pressure in the fuel tank 1 is maintained at the atmospheric pressure.

Instead of using a fuel vapor purifying means equipped with the canister, another fuel vapor purifying means may be used in which the upper space in the fuel tank 1 is connected to the intake passage of the engine, without arranging the canister therebetween, and in which fuel vapor generated in the fuel tank 1 is fed into the engine so that the fuel vapor is purified in the engine. In this case, a fuel vapor purifying means as disclosed in Japanese Examined Utility Model Publication No. 60-23501 can be used.

In this fuel vapor purifying means, the upper space in the fuel tank is connected to the vacuum tank via the shutoff valve, and the vacuum tank is connected to the intake passage of the engine via the check valve, which allows only the outflow of fuel vapor from the vacuum tank to the intake passage. In this fuel vapor purifying means, when the fuel filling operation is carried out, the shutoff valve is opened. As a result, the pressure in the fuel tank is allowed to escape, and at the same time, fuel vapor generated in the fuel tank is sucked into the vacuum tank. When the engine is operating, the fuel vapor stored in the vacuum tank is fed into the intake passage via the check valve and then purified in the engine. In this fuel vapor purifying means, a switch operated in response to the opening action of the fuel inlet cap is provided, and when the fuel inlet cap is detached, the shutoff valve is opened. However, in place of such a switch, a switch operated in response to the insertion of the fuel pump nozzle may be provided for opening the shutoff valve when the fuel pump nozzle is inserted in the fuel inlet.

In the embodiment illustrated in FIG. 1, when the fuel filling operation is carried out, initially the cap is detached. Subsequently, the fuel pump nozzle 4 is inserted in the fuel inlet pipe 2 from the fuel inlet 3 as illustrated in FIG. 1, and the fuel 9 is then spouted from the tip of the fuel pump nozzle 4. This fuel 9 passes through the throat portion 8 of the restricted opening means 7 and then comes into violent contact with and agitates the fuel in the fuel tank 1, causing bubbles to form in the fuel in the fuel tank 1. The collapsing of these bubbles causes fuel vapor to be generated in the fuel tank 1. However, since the throat portion 8 of restricted opening means 7 is shut off by the fuel 9, the fuel vapor and the bubbles cannot flow into the fuel inlet pipe 2 via the restricted opening means 7, and thus are fed into the canister 10 via the conduit 11. Consequently, it is possible to prevent the fuel vapor in the fuel tank 1 from flowing out from the fuel inlet 3. In addition, since the bubbles do not flow into the fuel inlet pipe 2, there is no danger of a reaction by the sensor (not shown) to the bubbles. Therefore, it is possible to prevent the fuel filling operation from being automatically stopped before the fuel tank 1 is filled with fuel.

Figure 2:
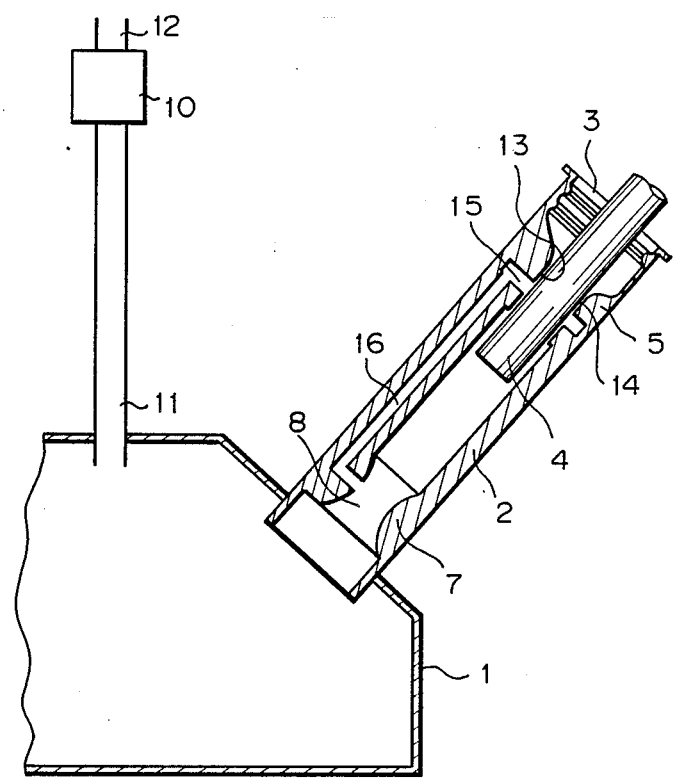
FIG. 2 is a cross-sectional side view of a second embodiment of a fuel tank according to the present invention.

FIG. 2 illustrates a second embodiment of the present invention. In FIG. 2, similar components are indicated by the same reference numerals as in FIG. 1. In this second embodiment, a restricted opening means 7 having a venturi shaped cross-section is also arranged in the fuel inlet pipe 2 at a position near the fuel tank 1 relative to the tip of the fuel pump nozzle 4 inserted in the fuel inlet 3. The throat portion 8 of the restricted opening means 7 also has an inner diameter such that fuel spouted from the fuel pump nozzle 4 passes through the entire cross-section of the throat portion 8. In addition, in this second embodiment, the guide means 5 has a cylindrical guide bore 13. This guide bore 13 has an inner diameter slightly larger than the outer diameter of the fuel pump nozzle 4, and thus an annular air gap 14 is formed between the outer circumferential wall of the fuel pump nozzle 4 and the inner circumferential wall of the guide bore 13. An annular groove 15 is formed on the inner circumferential wall of the guide bore 13 and connected to the throat portion 8 of the restricted opening means 7 via a connecting passage 16.

Also, in the second embodiment, since the throat portion 8 of the restricted opening means 7 is shut off by the fuel spouted from the fuel pump nozzle 4, the fuel vapor and the bubbles generated in the fuel tank 1 do not flow into the fuel inlet pipe 2 via the throat portion 8 of the restricted opening means 7. In addition, in the second embodiment, since the fuel spouted from the fuel pump nozzle 4 flows within the throat portion 8 of the restricted opening means 7 at a high speed, a vacuum is produced in the throat portion 8. As a result, on one hand the outside air flows into the connecting passage 16 from the fuel inlet 3 via the annular air gap 14 and the annular groove 15 and is sucked into the throat portion 8, and on the other hand, the fuel vapor existing in the fuel inlet pipe 2 around the tip of the fuel pump nozzle 4 also flows into the connecting passage 16 via the annular air gap 14 and the annular groove 15 and is sucked into the throat portion 8. Consequently, it is possible to prevent the fuel vapor in the fuel inlet pipe 2 from flowing out from the fuel inlet 3.

In both of the above embodiments, the restricted opening means 7 has a venturi shaped cross-section. Consequently, the flow resistance of the restricted opening means 7 is low, and since the restricted opening means 7 does not obstruct the fuel stream spouted from the fuel pump nozzle 4, there is no danger of the fuel remaining in the fuel inlet pipe 2.

In both embodiments according to the present invention, it is possible to prevent the fuel vapor generated in the fuel tank from escaping to the outside air, and to prevent the fuel filling operation from being stopped by the bubbles generated in the fuel tank.

While the invention has been described by reference to specific embodiments chosen for purposes of illustration, it should be apparent that numerous modifications could be made thereto by those skilled in the art without departing from the basic concept and scope of the invention.

We claim:
1. A fuel tank having an interior space therein comprising:
   a fuel inlet pipe connected to said interior space and having a fuel inlet for receiving a fuel pump nozzle having a tip;
   restricted opening means disposed in said fuel inlet pipe between said interior space and the tip of said fuel pump nozzle when inserted into said fuel inlet, said restricted opening means forming a throat portion which has an inner diameter smaller than that of said fuel inlet pipe, said throat portion being filled during use by a fuel stream emanating from said fuel pump nozzle to prevent fuel vapor from escaping through said throat portion;
   fuel vapor purifying means in communication with said interior space for relieving pressure in said interior space and for purifying fuel vapor generated in said interior space;
   guide means in the fuel inlet pipe forming therein a guide bore through which said fuel pump nozzle extends, said guide bore having an inner diameter, which is larger than an outer diameter of said fuel pump nozzle, to form an annular air gap between said guide bore and said fuel pump nozzle; and
   communication means for placing said annular air gap in communication with said throat portion including a passage in said fuel inlet pipe through which vapor is drawn from said annular air gap to said throat portion when a vacuum is established in said throat portion by a fuel stream flowing through said throat portion.

2. A fuel tank according to claim 1, wherein said restricted opening means has a venturi shaped cross-section.

3. A fuel tank according to claim 1, wherein said fuel vapor purifying means comprises a canister containing charcoal therein and connected to said interior space.

4. A fuel tank having an interior space therein comprising:

a fuel inlet pipe connected to said interior space and having a fuel inlet for receiving a fuel pump nozzle having a tip;

restricted opening means disposed in said fuel inlet pipe between said interior space and the tip of said fuel pump nozzle when inserted into said fuel inlet, said restricted opening means forming a throat portion which has an inner diameter smaller than that of said fuel inlet pipe, said throat portion being filled during use by a fuel stream from said nozzle to prevent fuel vapor from escaping through said throat portion;

fuel vapor purifying means in communication with said interior space for relieving pressure in said interior space and for purifying fuel vapor generated in said interior space;

guide means in the fuel inlet pipe forming therein a guide bore through which said fuel pump nozzle extends, said guide bore having a cylindrical inner wall having an inner diameter, said inner diameter being larger than an outer diameter of said fuel pump nozzle, to form an annular air gap between said guide bore and said fuel pump nozzle;

an annular groove formed in the cylindrical inner wall of said guide bore; and communication means formed integrally with said fuel inlet pipe for placing said annular groove in communication with said throat portion including a passage in said fuel inlet pipe through which vapor is drawn from said annular air gap to said throat portion when a vacuum is established in said throat portion by a fuel stream flowing through said throat portion.

5. A fuel tank according to claim 4, wherein said restricted opening means has a venturi shaped cross-section.

6. A fuel tank according to claim 4, wherein said fuel vapor purifying means comprises a canister containing charcoal therein and connected to said interior space.

* * * * *